US012253019B1

(12) United States Patent
Miyazaki

(10) Patent No.: US 12,253,019 B1
(45) Date of Patent: Mar. 18, 2025

(54) CONTROL DEVICE FOR INTERNAL COMBUSTION ENGINE

(71) Applicant: TOYOTA JIDOSHA KABUSHIKI KAISHA, Toyota (JP)

(72) Inventor: Koji Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/757,908

(22) Filed: Jun. 28, 2024

(30) Foreign Application Priority Data

Oct. 20, 2023 (JP) .................................. 2023-181244

(51) Int. Cl.
  *F02B 37/18* (2006.01)
  *F01N 3/28* (2006.01)
  *F02B 37/02* (2006.01)
(52) U.S. Cl.
  CPC .......... *F02B 37/183* (2013.01); *F01N 3/2839* (2013.01); *F02B 37/025* (2013.01)
(58) Field of Classification Search
  CPC .............................. F02B 37/183; F01N 3/2839
  See application file for complete search history.

(56) References Cited

U.S. PATENT DOCUMENTS

| 10,557,396 B2* | 2/2020 | Kimura | F02B 37/013 |
| 2017/0145936 A1* | 5/2017 | Kimura | F02D 41/123 |
| 2017/0152793 A1* | 6/2017 | Albrecht | F01N 13/00 |

FOREIGN PATENT DOCUMENTS

| DE | 102018115380 A1 * | 1/2019 | F01N 13/00 |
| JP | 2023-058325 A | 4/2023 | |
| WO | WO-2013145278 A1 * | 10/2013 | F01N 13/08 |

* cited by examiner

Primary Examiner — Ngoc T Nguyen
(74) Attorney, Agent, or Firm — SoraIP, Inc.

(57) ABSTRACT

The processing device of the control device performs first control of controlling the opening degree of the wastegate valve to an opening degree in which the inner peripheral surface of the insulating portion is positioned on the extension line of the seal surface of the wastegate valve, when the internal combustion engine is started. The processing device determines whether the warm-up of the internal combustion engine is completed. When the warm-up is completed, the processing device ends the first control. Thereafter, the processing device starts second control for controlling the opening degree of the wastegate valve in accordance with the target supercharging pressure of the internal combustion engine. When the warm-up of the internal combustion engine is not completed, the processing device continues the first control. Then, the processing device executes this series of processes again at every predetermined control cycle until the first control ends.

5 Claims, 4 Drawing Sheets

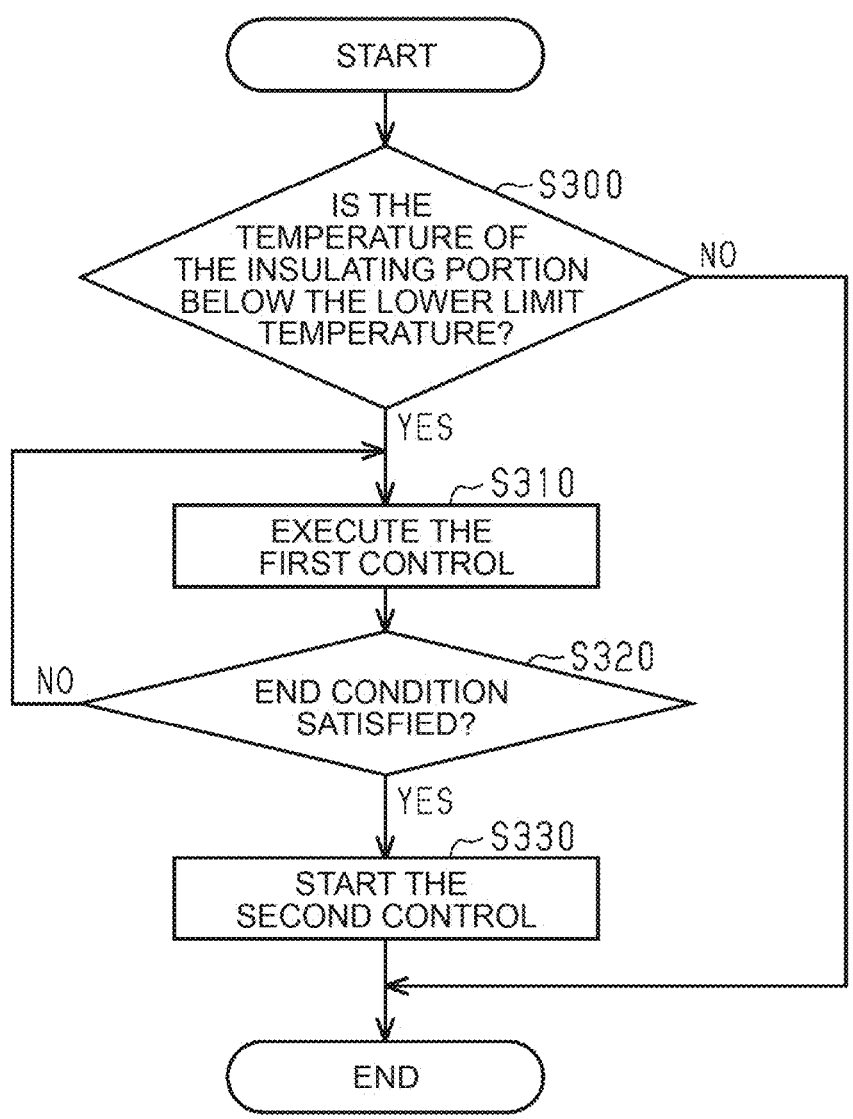

CONTROL DEVICE FOR INTERNAL COMBUSTION ENGINE

CROSS-REFERENCE TO RELATED APPLICATION

This application claims priority to Japanese Patent Application No. 2023-181244 filed on Oct. 20, 2023, incorporated herein by reference in its entirety.

BACKGROUND

1. Technical Field

The present disclosure relates to a control device for an internal combustion engine mounted on a vehicle including a turbocharger and an electrically heated catalyst device.

2. Description of Related Art

There is known an electrically heated catalyst device in which a supported catalyst is heated by heating a catalyst support by energization. The catalyst support is attached while being electrically insulated from a tubular case that houses the catalyst support. In such an electrically heated catalyst device, conductive particulate matter contained in exhaust gas may be deposited on the insulating portion, and thus the insulating property between the catalyst support and the case may be deteriorated.

There have been disclosed technologies using thermophoresis to suppress the deposition of particulate matter on the insulating portion. Japanese Unexamined Patent Application Publication No. 2023-058325 (JP 2023-058325 A) describes a catalyst device. The catalyst device suppresses deposition of particulate matter on an insulating portion of an internal partition member in contact with exhaust gas by thermophoresis using, as a driving force, a temperature gradient in a space between an external partition member whose outer peripheral surface is exposed to outside air and the insulating portion.

SUMMARY

In an internal combustion engine including a turbocharger, it is known that the temperature of exhaust gas decreases when it passes through a turbine wheel. In the case of a vehicle including the turbocharger, there is a possibility that the catalyst device does not have such a large temperature gradient between the external partition member and the insulating portion of the internal partition member that causes thermophoresis to suppress the deposition of particulate matter.

Hereinafter, means for solving the above problem and its operations and effects will be described.

A control device for an internal combustion engine for solving the above problem controls an internal combustion engine including a turbine wheel installed in an exhaust passage, a bypass passage that branches from the exhaust passage at a portion upstream of the turbine wheel in the exhaust passage and merges with the exhaust passage at a portion downstream of the turbine wheel in the exhaust passage, a catalyst device for exhaust gas control that is installed at a portion downstream of a merging position in the exhaust passage, and a wastegate valve that is installed at a portion upstream of the catalyst device in the exhaust passage and closes an outlet of the bypass passage.

The catalyst device is an electrically heated catalyst device in which a catalyst provided in the exhaust passage is heated by energization.

Members that partition the exhaust passage through which exhaust gas is guided to the catalyst include an internal partition member that supports the catalyst inside in an electrically insulated state, and an external partition member that is connected to the internal partition member from outside and covers an end of the internal partition member on an upstream side of the exhaust gas from the outside while being separated in a radial direction to constitute an outer shell of the exhaust passage.

A portion of the internal partition member that is covered by the external partition member is an insulating portion continuous from a portion that supports the catalyst.

The control device for the internal combustion engine includes a processing device.

The processing device is configured to, when the internal combustion engine is started, perform first control for controlling an opening degree of the wastegate valve to an opening degree at which an inner peripheral surface of the insulating portion is positioned on an extension line of a sealing surface of the wastegate valve.

The control device can maintain the insulating property of the insulating portion even when the temperature of the exhaust gas decreases through the bypass passage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart of the wastegate valve control executed by the control device in a modification of the second embodiment.

DETAILED DESCRIPTION OF EMBODIMENTS

First Embodiment

Figure 1:
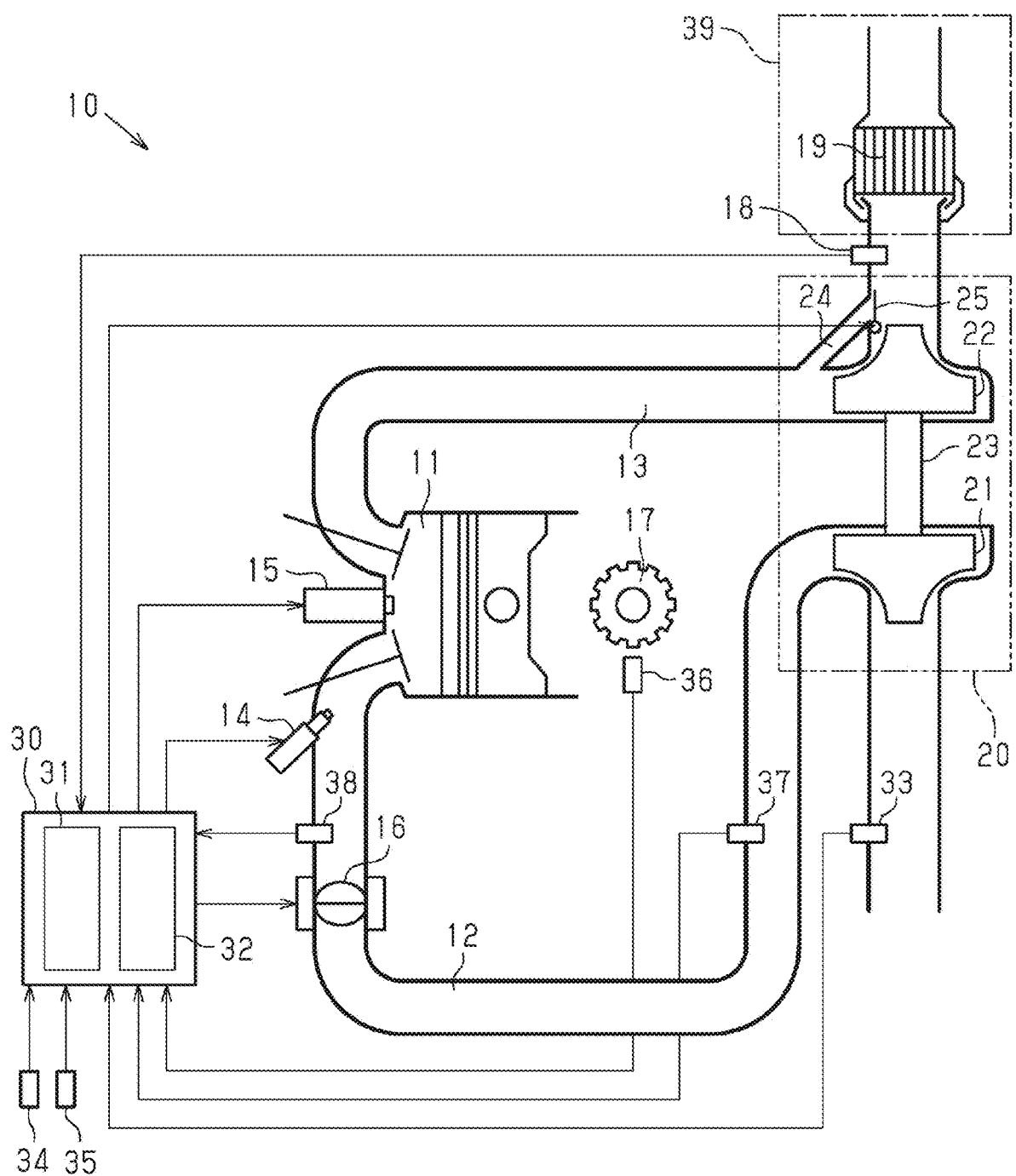
FIG. 1 is a schematic diagram illustrating a configuration of an internal combustion engine of a vehicle to which an embodiment of a control device for an internal combustion engine is applied.

Hereinafter, a first embodiment of a control device for an internal combustion engine will be described with reference to FIGS. 1 to 3.

Configuration of the Internal Combustion Engine 10

First, a configuration of the internal combustion engine 10 to be controlled by the control device 30 of the internal combustion engine 10 will be described with reference to FIG. 1. The internal combustion engine 10 includes a combustion chamber 11 that performs combustion of an air-fuel mixture. Further, the internal combustion engine 10 includes an intake passage 12, which is a passage for introducing intake air into the combustion chamber 11, and an exhaust passage 13, which is a passage for discharging exhaust gas from the combustion chamber 11. Further, the internal combustion engine 10 includes an injector 14 that injects fuel into the intake air to form an air-fuel mixture, and an ignition device 15 that ignites the air-fuel mixture in the combustion chamber 11 by spark discharge. A throttle valve 16 is installed in a portion of the intake passage 12 downstream of the compressor wheel 21. The throttle valve 16 adjusts the amount of intake air introduced into the combustion chamber 11 in accordance with the change of the opening degree. Then, the internal combustion engine 10 generates the driving force of the vehicle by rotating the crankshaft 17 by the combustion of the air-fuel mixture in the combustion chamber 11.

The internal combustion engine 10 includes a turbocharger 20. The turbocharger 20 includes a compressor wheel 21 installed in the intake passage 12 and a turbine wheel 22 installed in the exhaust passage 13. The compressor wheel 21 is an impeller that compresses intake air in accordance with rotation. The turbine wheel 22 is an impeller that rotates in response to an exhaust flow. The compressor wheel 21 and the turbine wheel 22 are connected to each other via a turbine shaft 23. Thus, the compressor wheel 21 rotates in conjunction with the rotation of the turbine wheel 22.

The exhaust passage 13 is provided with a bypass passage 24 which is a passage for flowing the exhaust gas downstream by bypassing the turbine wheel 22. The bypass passage 24 branches off from the exhaust passage 13 at a portion upstream of the turbine wheel 22 in the exhaust passage 13. The bypass passage 24 merges with the exhaust passage 13 at a position on the downstream side of the turbine wheel 22 in the exhaust passage 13.

A catalyst device 39 is provided at a portion downstream of the merging position of the bypass passage 24 and the exhaust passage 13. A catalyst carrier 19 on which a catalyst for exhaust gas purification is supported is provided inside the catalyst device 39. The catalyst device 39 is an electrically heated catalyst device in which the catalyst carrier 19 provided in the exhaust passage 13 is heated by energization. A detailed configuration of the catalyst device 39 will be described later.

The exhaust passage 13 is provided with a wastegate valve 25 for opening and closing the outlet of the bypass passage 24. The wastegate valve 25 is disposed on the downstream side of the junction position between the bypass passage 24 and the exhaust passage 13 in the exhaust passage 13 and on the upstream side of the catalyst device 39. An exhaust gas temperature sensor 18 for detecting an exhaust gas temperature is provided in the exhaust passage 13. The exhaust gas temperature sensor 18 is disposed on the downstream side of the wastegate valve 25 in the exhaust passage 13 and on the upstream side of the catalyst device 39.

Configuration of the Control Device 30

The internal combustion engine 10 is controlled by a control device 30. The control device 30 includes a processing device 31 and a storage device 32. The storage device 32 stores programs and data for controlling the internal combustion engine 10. The processing device 31 controls the internal combustion engine 10 by reading and executing a program from the storage device 32.

The control device 30 receives detection results of various sensors for detecting the operating state of the internal combustion engine 10. The sensors input to the control device 30 include an air flow meter 33, an intake air temperature sensor 34, a water temperature sensor 35, a crank angle sensor 36, a supercharging pressure sensor 37, an intake manifold pressure sensor 38, and an exhaust gas temperature sensor 18.

The air flow meter 33 is a sensor that detects an intake air flow rate that is a flow rate of intake air flowing through the intake passage 12. The intake air temperature sensor 34 is a sensor that detects an intake air temperature that is the temperature of the intake air taken into the intake passage 12. The water temperature sensor 35 is a sensor that detects an engine water temperature that is the temperature of the coolant of the internal combustion engine 10. The crank angle sensor 36 is a sensor that detects a crank angle that is a rotation angle of the crankshaft 17. The supercharging pressure sensor 37 is a sensor that detects a supercharging pressure that is a pressure of intake air in a portion of the intake passage 12 downstream of the compressor wheel 21 and upstream of the throttle valve 16. The intake manifold pressure sensor 38 is a sensor that detects an intake manifold pressure that is a pressure of intake air in a portion of the intake passage 12 downstream of the throttle valve 16. The processing device 31 of the control device 30 controls the opening degree of the wastegate valve 25 based on the detection results of these sensors. In addition, in the present embodiment, the processing device 31 controls the fuel injection amount and the fuel injection timing of the injector 14, the ignition timing of the ignition device 15, the throttle opening degree, and the like based on the detection results of these sensors.

Configuration of the Turbocharger 20

Next, the configuration of the turbocharger 20 will be described with reference to FIG. 2.

Figure 2:
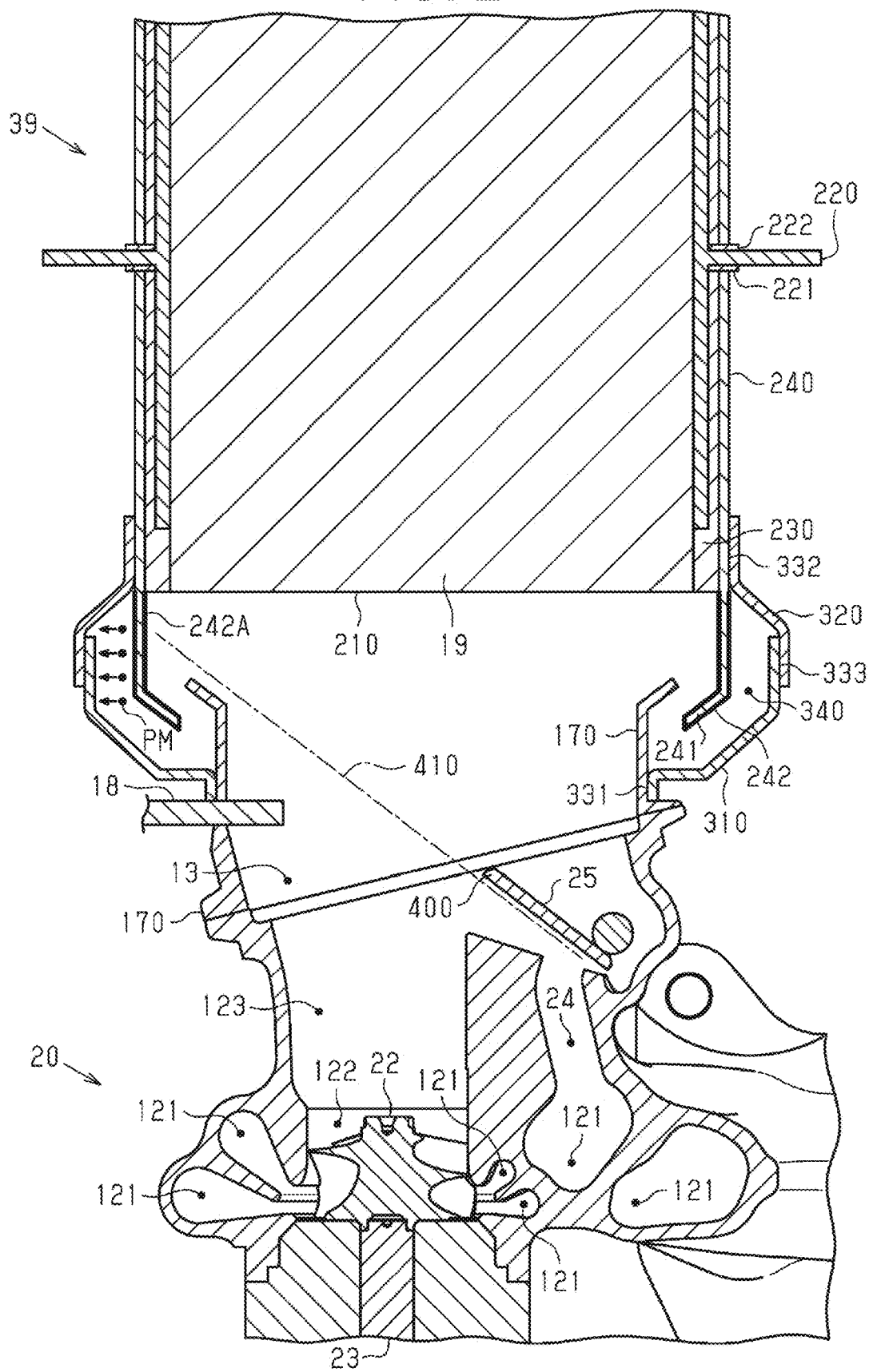
FIG. 2 is a cross-sectional view of a bypass passage, a wastegate valve, and an electrically heated catalyst device in a vehicle to which the control device of the embodiment is applied.

As illustrated in FIG. 2, the turbocharger 20 defines two scroll passages 121, an accommodation space 122, an exhaust outlet 123, and two bypass passages 24 as spaces through which exhaust gas flows. In FIG. 2, one bypass passage 24 is illustrated. The scroll passage 121 extends in an arc shape so as to surround the turbine wheel 22. An upstream end of the scroll passage 121 is connected to the exhaust passage 13 shown in FIG. 1. The downstream end of the scroll passage 121 is connected to the accommodation space 122. The accommodation space 122 is a space in which the turbine wheel 22 is located. The accommodation space 122 is connected to the exhaust outlet 123. The downstream end of the exhaust outlet 123 is connected to an introduction pipe 170. The introduction pipe 170 is a part of the exhaust passage 13. Each bypass passage 24 connects the scroll passage 121 and the exhaust outlet 123.

The wastegate valve 25 is provided at the outlet of the bypass passage 24. Bypass passage 24 is opened and closed by wastegate valve 25. That is, when the wastegate valve 25 is open, the bypass passage 24 bypasses the turbine wheel 22 and communicates the portion on the exhaust upstream side with the turbine wheel 22 and the portion on the exhaust downstream side with respect to the turbine wheel 22. As the opening degree of the wastegate valve 25 increases, the flow rate of the exhaust gas bypassing the turbine wheel 22 increases. As a result, the supercharging pressure caused by the driving of the turbocharger 20 is lowered.

Configuration of the Catalyst Device 39

Next, the configuration of the catalyst device 39 will be described. As shown in FIG. 2, the catalyst device 39 includes a catalyst carrier 19 on which a catalyst for reducing exhaust gas is supported. The catalyst carrier 19 is a porous body. For example, the catalyst carrier 19 is a structure including a honeycomb structure in which a plurality of passages extending in the flow direction of exhaust gas are partitioned. The catalyst supported on the catalyst carrier 19 is, for example, a three-way catalyst.

The catalyst device 39 includes a case 240 that is a tube containing the catalyst carrier 19. The case 240 is a tube made of a metal raw material. For example, the case 240 is formed of stainless steel. An end face of the catalyst carrier 19 housed in the case 240 on the upstream side of the exhaust gas is defined as a catalyst upstream end 210. A portion of the case 240 on the exhaust upstream side with the catalyst upstream end 210 as a boundary is referred to as an end portion 241. End 241 is continuous from case 240. The end portion 241 protrudes further to the exhaust upstream side than the catalyst upstream end 210. The surface of the end portion 241 is covered with an insulator. An insulating layer is formed on the end portion 241 by an insulator covering the entire surface of the end portion 241. Thus, the surface of the end portion 241 is the insulating portion 242. That is, the insulating portion 242 is electrically insulated from the catalyst carrier 19. The case 240, the end portion 241, and the insulating portion 242 correspond to the internal partition member.

The catalyst device 39 includes a pair of electrodes 220 for energizing the catalyst carrier 19. An electrode insertion hole 221 into which the electrode 220 is inserted is opened in the case 240. The electrode insertion hole 221 is closed by the electrode holding portion 222. The electrode 220 is connected to the catalyst carrier 19. By applying a voltage between the pair of electrodes 220, a current flows through the catalyst carrier 19. When a current flows through the catalyst carrier 19, the catalyst carrier 19 generates heat due to the electrical resistance of the catalyst carrier 19. That is, the catalyst carrier 19 is a substance that generates heat in accordance with the electrical resistance when energized. For example, the catalyst carrier 19 is a ceramic made of silicon carbide. The electrode 220 connected to the catalyst carrier 19 through the electrode insertion hole 221 protrudes to the outside of the case 240. The electrode holding portion 222 is an insulator having a low electrical conductivity. Since the electrode holding portion 222 supports the electrode 220, a current is prevented from flowing through the case 240.

The catalyst device 39 includes a mat 230 that fixes the catalyst carrier 19 to the case 240. The case 240 supports the catalyst carrier 19 via the mat 230. The mat 230 is an insulator having a low electrical conductivity. For example, the mat 230 is an inorganic fiber containing alumina as a main component. Since the catalyst carrier 19 is covered with the mat 230, electricity does not flow to the case 240 when the catalyst carrier 19 is energized. That is, the case 240 is electrically insulated from the catalyst carrier 19.

Connection Between the Turbocharger 20 and the Catalyst Device 39

Next, the connection between the turbocharger 20 and the catalyst device 39 will be described.

As shown in FIG. 2, the case 240 and the introduction pipe 170 are connected by the first connection pipe 310 and the second connection pipe 320. The first connection pipe 310 and the second connection pipe 320 constitute a part of the outer shell of the exhaust passage 13. That is, the first connection pipe 310 and the second connection pipe 320 correspond to the external partition member. The first connection pipe 310 is connected from the outside to the exhaust downstream side of the introduction pipe 170 in the first connection portion 331. The second connection pipe 320 is connected from the outside to the exhaust downstream side of the insulating portion 242 in the case 240 in the second connecting portion 332. The first connection pipe 310 is connected to the second connection pipe 320 from the inside at the third connecting portion 333. Since the external partition member is joined to the introduction pipe 170 and the case 240, a space between the introduction pipe 170 and the insulating portion 242 is sealed.

The introduction pipe 170 is inserted into the case 240. The introduction pipe 170 and the insulating portion 242 continuous from the case 240 are spaced apart from each other in the radial direction to form a double tube structure. Further, a portion of the external partition member between the first connecting portion 331 and the second connecting portion 332 is spaced apart from the introduction pipe 170 and the insulating portion 242 in the radial direction to constitute a double tube structure. In addition, the introduction pipe 170, the insulating portion 242, and the external partition member are spaced apart from each other in the radial direction to form a triple tube structure. As described above, the catalyst device 39 includes a triple tube structure and a plurality of double tube structures at a portion on the upstream side in the exhaust direction with respect to the catalyst carrier 19. The triple tube structure and the plurality of double tube structures form a labyrinth portion 340 through which exhaust can flow. The labyrinth portion 340 communicates with the exhaust passage 13 by a gap between the introduction pipe 170 and the insulating portion 242.

Control of the Wastegate Valve 25 Executed by the Processing Device 31

The processing device 31 performs one of the first control and the second control on the wastegate valve 25. When the internal combustion engine 10 is started, the processing device 31 executes the first control.

As illustrated in FIG. 2, the first control is a control in which the processing device 31 changes the opening degree of the wastegate valve 25 to an opening degree at which the inner peripheral surface 242A of the insulating portion 242 is positioned on the extension line 410 of the sealing surface 400 of the wastegate valve 25. The sealing surface 400 is a surface that closes the outlet of the bypass passage 24 in the wastegate valve 25. The sealing surface 400 of the wastegate valve 25 is planar.

On the other hand, the second control is a control in which the processing device 31 changes the opening degree of the wastegate valve 25 in accordance with the target supercharging pressure of the internal combustion engine 10. In the second control, the processing device 31 sets the target supercharging pressure in accordance with the operating state of the internal combustion engine 10. Further, the processing device 31 controls the opening degree of the wastegate valve 25 so that the supercharging pressure becomes the target supercharging pressure.

Figure 3:
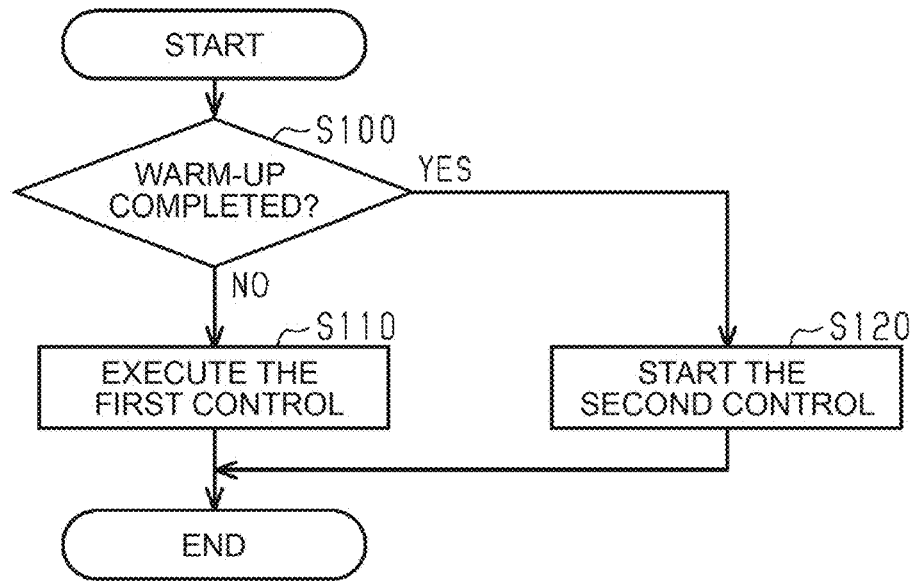
FIG. 3 is a flowchart of wastegate valve control performed by the control device of the first embodiment.

FIG. 3 shows a flow of a series of processes executed by the processing device 31. This series of processing is executed by the processing device 31 upon completion of the start of the internal combustion engine 10. This series of processes is repeatedly executed at predetermined control cycles until the processing device 31 ends the execution of the second control.

When this series of processes is started, the processing device 31 first determines whether the warm-up of the internal combustion engine 10 is completed in S100 process. For example, the processing device 31 determines that the warm-up of the internal combustion engine 10 is completed when the engine water temperature of the internal combustion engine 10 acquired from the water temperature sensor 35 becomes equal to or higher than a predetermined value.

When the warm-up of the internal combustion engine 10 is not completed (S100:NO), the process proceeds to S110.

In S110 process, the processing device 31 executes the first control. When S110 process is executed, the processing device 31 temporarily ends the series of processes. Thereafter, the processing device 31 executes this series of processes again at every predetermined control cycle.

On the other hand, when the warm-up of the internal combustion engine 10 is completed (S100:YES), the process proceeds to 5120. In S120 process, when the first control is not executed, the processing device 31 starts the second control. In S120 process, when the first control is being executed, the processing device 31 ends the first control. Thereafter, the processing device 31 starts the second control. When S120 process is executed, the processing device 31 ends the series of processes.

That is, the processing device 31 executes the first control until the warm-up of the internal combustion engine 10 is completed. When the warm-up of the internal combustion engine 10 is completed, the first control is ended and the second control is executed.

Operation of the First Embodiment

The processing device 31 of the control device 30 can concentratedly apply the exhaust gas blown out from the outlet of the bypass passage 24 to the inner peripheral surface 242A of the insulating portion 242 which is an internal partition member by controlling the opening degree of the wastegate valve 25 at the time of starting the internal combustion engine 10. As a result, the temperature of the insulating portion 242 is more likely to increase than when the exhaust gas wiped from the outlet of the bypass passage 24 is not concentrated on the inner peripheral surface 242A of the insulating portion 242. As a result, the temperature difference between the insulating portion 242 and the external partition member increases. As the temperature difference between the insulating portion 242 and the external partition member increases, the temperature gradient between the insulating portion 242 and the external partition member increases. As the temperature gradient increases, the thermophoresis driven by the temperature gradient becomes active. Consequently, the particulate matter PM easily moves from the vicinity of the insulating portion 242 on the high-temperature side toward the external partition member on the low-temperature side by thermophoresis. Therefore, the accumulation of the particulate matter PM in the insulating portion 242 is suppressed.

Effect of the 1 Embodiment (1) The control device 30 can maintain the insulating property of the insulating portion 242 even when the temperature of the exhaust gas decreases through the bypass passage 24.
(2) The control device 30 executes a first control in which the processing device 31 controls the opening degree of the wastegate valve 25 to an opening degree at which the inner peripheral surface 242A of the insulating portion 242 is positioned on the extension line 410 of the sealing surface 400 of the wastegate valve 25. In addition, the control device 30 executes a second control in which the processing device 31 controls the opening degree of the wastegate valve 25 in accordance with the target supercharging pressure of the internal combustion engine 10. When the warm-up of the internal combustion engine 10 is completed, the quantity of particulate matter PM contained in the exhaust gas stably decreases. The temperature of the exhaust gas passing through the bypass passage 24 is also increased. Therefore, the processing device 31 terminates the first control when the warm-up of the internal combustion engine 10 is completed. Subsequently, the processing device 31 executes the second control. Thus, the control device 30 can shift the control of the wastegate valve 25 from the first control to the second control at an appropriate timing. Furthermore, the control device 30 can execute normal supercharging pressure control for realizing the target supercharging pressure in the second control.

Modification of the First Embodiment

The present embodiment can be modified and implemented as follows. The present embodiment and modification examples described below may be carried out in combination of each other within a technically consistent range.

When determining whether the warm-up of the internal combustion engine 10 is completed, the processing device 31 of the control device 30 may determine that the warm-up is completed when the lubricating oil temperature in the internal combustion engine 10 is equal to or higher than a predetermined temperature. The processing device 31 may acquire information on the lubricating oil temperature from the lubricating oil temperature sensor.

When determining whether or not the warm-up of the internal combustion engine 10 is completed, the processing device 31 may determine that the warm-up has been completed when the integrated intake air flow rate from the start of operation becomes equal to or larger than a predetermined value. The processing device 31 may calculate the integrated intake air flow rate from the intake air flow rate acquired from the air flow meter 33.

When determining whether the warm-up of the internal combustion engine 10 is completed, the processing device 31 may correct a predetermined value of the integrated intake air flow rate for determining that the warm-up has been completed based on the intake air temperature detected by the intake air temperature sensor 34. For example, when the intake air temperature is low, the processing device 31 may correct a predetermined value of the integrated intake air flow rate for determining that the warm-up of the internal combustion engine 10 is completed to a high value.

Second Embodiment

Figure 4:
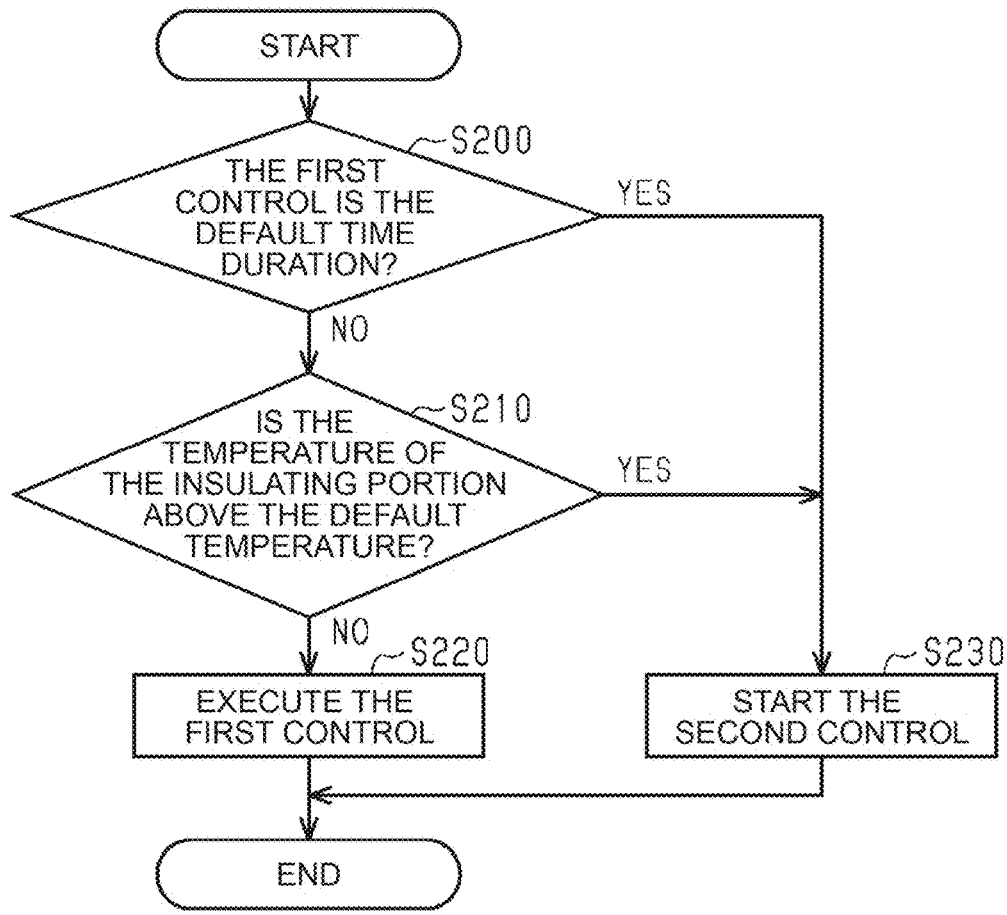
FIG. 4 is a flowchart of the wastegate valve control executed by the control device of the second embodiment.

Next, a second embodiment will be described with reference to FIG. 4. The second embodiment will be mainly described with respect to differences from the first embodiment. In the second embodiment, the processing device 31 of the control device 30 changes the control of the wastegate valve 25 based on a determination criterion different from that in the first embodiment.

In the second embodiment, the processing device 31 executes the first control at the time of starting the internal combustion engine 10 as in the first embodiment. FIG. 4 shows a flow of a series of processes executed by the processing device 31 in the second embodiment. This series of processing is executed by the processing device 31 upon completion of the start of the internal combustion engine 10. This series of processes is repeatedly executed at predetermined control cycles until the processing device 31 ends the execution of the first control.

When this series of processes is started, the processing device 31 first determines whether or not the first control continues for a predetermined period or longer in S200 process.

When the first control does not continue for a predetermined period or longer (S200:NO), the process proceeds to S210. In S210 process, the processing device 31 estimates whether or not the temperature of the insulating portion 242 is equal to or higher than a predetermined temperature. For example, when the amount of heat received from the exhaust by the insulating portion 242 becomes equal to or greater than a predetermined value, the processing device 31 may estimate that the insulating portion 242 is equal to or greater than the predetermined temperature. The amount of heat received by the insulating portion 242 from the exhaust gas correlates with the flow rate of the exhaust gas corresponding to the insulating portion 242. The flow rate of the exhaust gas is correlated with the intake air flow rate. Therefore, the processing device 31 determines whether or not the amount of heat received from the exhaust by the insulating portion 242 is equal to or greater than a predetermined value based on the integrated intake air flow rate calculated from the intake air flow rate acquired from the air flow meter 33.

When it is estimated that the temperature of the insulating portion 242 is equal to or higher than the predetermined temperature (S210:YES), the process proceeds to S230. In S230 process, the processing device 31 ends the first control. Thereafter, the processing device 31 starts the second control. When S230 process is executed, the processing device 31 ends the series of processes. If it is estimated that the temperature of the insulating portion 242 is less than the predetermined value (S210:NO), the process proceeds to S220. In S220 process, the processing device 31 executes the first control. When S220 process is executed, the processing device 31 temporarily ends the series of processes. Thereafter, the processing device 31 executes this series of processes again at every predetermined control cycle.

On the other hand, when the first control is continued for a predetermined period or longer (S200:YES), the process proceeds to S230. In S230 process, the processing device 31 ends the first control. Thereafter, the processing device 31 starts the second control. When S230 process is executed, the processing device 31 ends the series of processes.

Operation of the Second Embodiment

If the temperature of the insulating portion 242 is sufficiently high, it is considered that the temperature gradient between the insulating portion 242 and the external partition member can be maintained sufficiently large to thermally migrate the particulate matter PM even if the first control is terminated.

Therefore, the processing device 31 of the control device 30 terminates the first control on condition that the temperature of the insulating portion 242 is equal to or higher than the predetermined temperature. Subsequently, the processing device 31 performs the second control.

Effect of the 2 Embodiment (1) The control device 30 can control the internal combustion engine 10 so as to satisfy the target supercharging pressure of the internal combustion engine 10 while maintaining the insulating property of the insulating portion 242.
(2) When the processing device 31 continues the first control for a predetermined time or longer, the control device 30 ends the first control. Thereafter, the processing device 31 starts the second control. If the first control lasts for a predetermined period or longer, it is believed that the thermal gradient between the insulating portion 242 and the external partition member can be maintained large enough to thermally migrate the particulate matter PM. Therefore, the processing device 31 terminates the first control on condition that the first control is continuously performed for a predetermined time or longer. Subsequently, the processing device 31 performs the second control. Thus, the control device 30 can control the internal combustion engine 10 so as to satisfy the target supercharging pressure of the internal combustion engine 10 while maintaining the insulating property of the insulating portion 242.

Modification of the Second Embodiment

The second embodiment can be modified as follows. The present embodiment and modification examples described below may be carried out in combination of each other within a technically consistent range.

When the warm-up of the internal combustion engine 10 is completed, the quantity of particulate matter PM contained in the exhaust gas stably decreases. The temperature of the exhaust gas passing through the bypass passage 24 is also increased. Therefore, the processing device 31 of the control device 30 may set the length of time for which it is determined that the first control has continued for a predetermined time or longer in S200 processing to a length sufficient to determine that the warm-up of the internal combustion engine 10 has been completed. Accordingly, the processing device 31 can shift the control of the wastegate valve 25 from the first control to the second control at an appropriate timing.

The processing device 31 may omit the processing of S210. That is, the processing device 31 may continue the first control only on condition that the duration of the first control is less than the predetermined time (S200:NO) (S220).

The processing device 31 may use information other than the integrated intake air flow rate in order to estimate whether or not the temperature of the insulating portion 242 is equal to or higher than a predetermined temperature. For example, when the detected value of the exhaust gas temperature sensor 18 is equal to or higher than a predetermined temperature, the processing device 31 may estimate that the temperature of the insulating portion 242 is equal to or higher than the predetermined temperature.

The processing device 31 may omit the processing of S200. That is, the processing device 31 may terminate the first control only on condition that the temperature of the insulating portion 242 is equal to or higher than the predetermined temperature (S210:YES). When the first control ends, the processing device 31 starts the second control (S230). Furthermore, the processing device 31 may continue the first control (S220) only on condition that the temperature of the insulating portion 242 is less than the predetermined temperature (S210:NO).

After shifting to the second control, the processing device 31 may control the wastegate valve 25 to apply the exhaust gas passing through the bypass passage 24 to the inner peripheral surface 242A of the insulating portion 242. For example, as shown in FIG. 5, when the temperature of the insulating portion 242 becomes lower than the lower limit temperature, the processing device 31 may control the opening degree of the wastegate valve 25 to apply the exhausted gas to the inner peripheral surface 242A of the insulating portion 242.

FIG. 5 shows a flow of a series of processes executed when the processing device 31 performs the second control. When this series of processes is started, the processing device 31 first determines whether or not the temperature of the insulating portion 242 is lower than the lower limit temperature in S300 process.

When the temperature of the insulating portion 242 is lower than the lower limit temperature (S300:YES), the process proceeds to S310. When the temperature of the insulating portion 242 is equal to or higher than the lower limit temperature (S300:NO), the present process is terminated without executing the process of the following S310 to S330.

In S310 process, the processing device 31 ends the second control. Thereafter, the processing device 31 starts the first control. Then, the process proceeds to S320. In S320 process, the processing device 31 determines whether or not the termination condition of the first control is satisfied. For example, when the temperature of the insulating portion 242 is estimated to be equal to or higher than the predetermined temperature, the processing device determines that the end condition of the first control is satisfied. For example, when the first control is continued for a predetermined time or longer, the processing device 31 determines that the end condition of the first control is satisfied.

When the termination condition of the first control is satisfied (S320:YES), the process proceeds to S330. In S330 process, the processing device 31 ends the first control. Thereafter, the processing device 31 resumes the second control. When S230 process is executed, the processing device 31 ends the series of processes.

When the termination condition of the first control is not satisfied (S320:NO), the processing device 31 repeatedly executes the processing of S320 for each predetermined control cycle.

While the processing device 31 performs the second control, the flow of the exhausted air blown out from the outlet of the bypass passage 24 is not concentrated on the inner peripheral surface 242A of the insulating portion 242. Therefore, the temperature of the insulating portion 242 may decrease while the processing device 31 performs the second control. The processing device 31 may terminate the second control on condition that the temperature of the insulating portion 242 is estimated to be lower than the lower limit temperature. When the second control is ended, the processing device 31 performs the first control. Accordingly, the processing device 31 can maintain the temperature of the insulating portion 242 at a temperature at which the effect of thermophoresis is exerted.

Other Modifications

In addition to the above, component elements that are commonly changeable through the above respective embodiments are as follow. The following modifications may be implemented in combination with each other to the extent that they are not technically inconsistent.

The vehicle to which the control device 30 is applied is not limited to a vehicle in which the thrust generation device is only the internal combustion engine 10. For example, it may be a series-parallel hybrid electric vehicle. For example, it may be a parallel hybrid electric vehicle. For example, it may be a series-type hybrid electric vehicle.

The control device 30 may be applied to an internal combustion engine 10 comprising a catalyst device 39 without a triple tube structure. For example, the control device 30 may be applied to the internal combustion engine 10 including the catalyst device 39 in which the introduction pipe 170 is not disposed inside the case 240.

The processing device 31 of the control device 30 starts the first control when the internal combustion engine 10 is started. Here, the starting time of the internal combustion engine 10 is not limited to the time when the ignition switch is switched from off to on. For example, after the idling stop process is executed and the internal combustion engine 10 is stopped, the control device 30 may start the first control when the idling stop process is completed and the internal combustion engine 10 is restarted. For example, after hybrid electric vehicle has stopped the internal combustion engine 10, the control device 30 may start the first control when the internal combustion engine 10 is restarted according to the condition of the vehicle.

What is claimed is:

1. A control device to be applied to an internal combustion engine including a turbine wheel installed in an exhaust passage, a bypass passage that branches from the exhaust passage at a portion upstream of the turbine wheel in the exhaust passage and merges with the exhaust passage at a portion downstream of the turbine wheel in the exhaust passage, a catalyst device for exhaust gas control that is installed at a portion downstream of a merging position in the exhaust passage, and a wastegate valve that is installed at a portion upstream of the catalyst device in the exhaust passage and closes an outlet of the bypass passage, the catalyst device being an electrically heated catalyst device in which a catalyst provided in the exhaust passage is heated by energization, members that partition the exhaust passage through which exhaust gas is guided to the catalyst including an internal partition member that supports the catalyst inside in an electrically insulated state, and an external partition member that is connected to the internal partition member from outside and covers an end of the internal partition member on an upstream side of the exhaust gas from the outside while being separated in a radial direction to constitute an outer shell of the exhaust passage, a portion of the internal partition member that is covered by the external partition member being an insulating portion continuous from a portion that supports the catalyst, the control device being configured to control the internal combustion engine, the control device comprising a processing device, wherein the processing device is configured to, when the internal combustion engine is started, perform first control for controlling an opening degree of the wastegate valve to an opening degree at which an inner peripheral surface of the insulating portion is positioned on an extension line of a sealing surface of the wastegate valve.

2. The control device according to claim 1, wherein the processing device is configured to, when warm-up of the internal combustion engine is completed, terminate the first control and start second control for controlling the opening degree of the wastegate valve based on a target turbocharging pressure of the internal combustion engine.

3. The control device according to claim 1, wherein the processing device is configured to, when a temperature of the insulating portion is estimated to be equal to or higher than a predetermined temperature, terminate the first control and start second control for controlling the opening degree of the wastegate valve based on a target turbocharging pressure of the internal combustion engine.

4. The control device according to claim 1, wherein when the first control continues for a predetermined period or longer, the first control is terminated and second control is started to control the opening degree of the wastegate valve based on a target turbocharging pressure of the internal combustion engine.

5. The control device according to claim 3, wherein when a temperature of the insulating portion is estimated to be lower than a lower limit temperature, the second control is terminated and the first control is performed.

* * * * *